Figure 9:
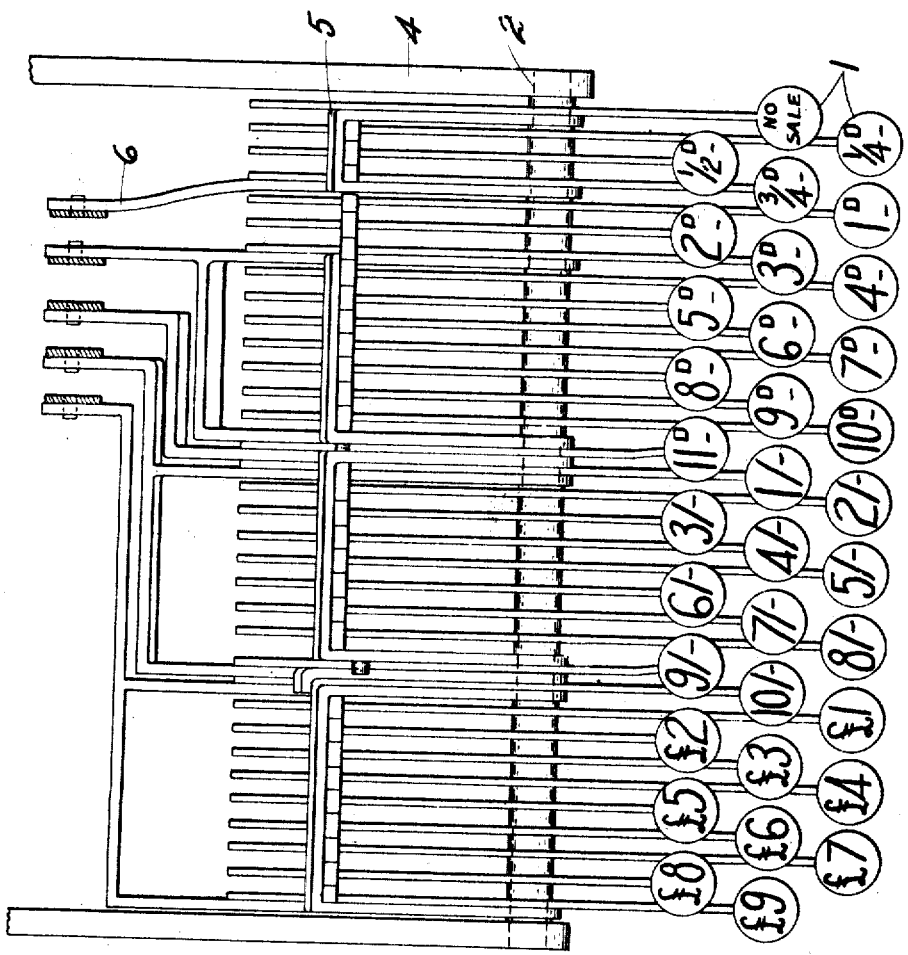

C. PALMER.
CASH REGISTER.
APPLICATION FILED MAR. 28, 1910.
1,011,996.
Patented Dec. 19, 1911.
6 SHEETS—SHEET 1.
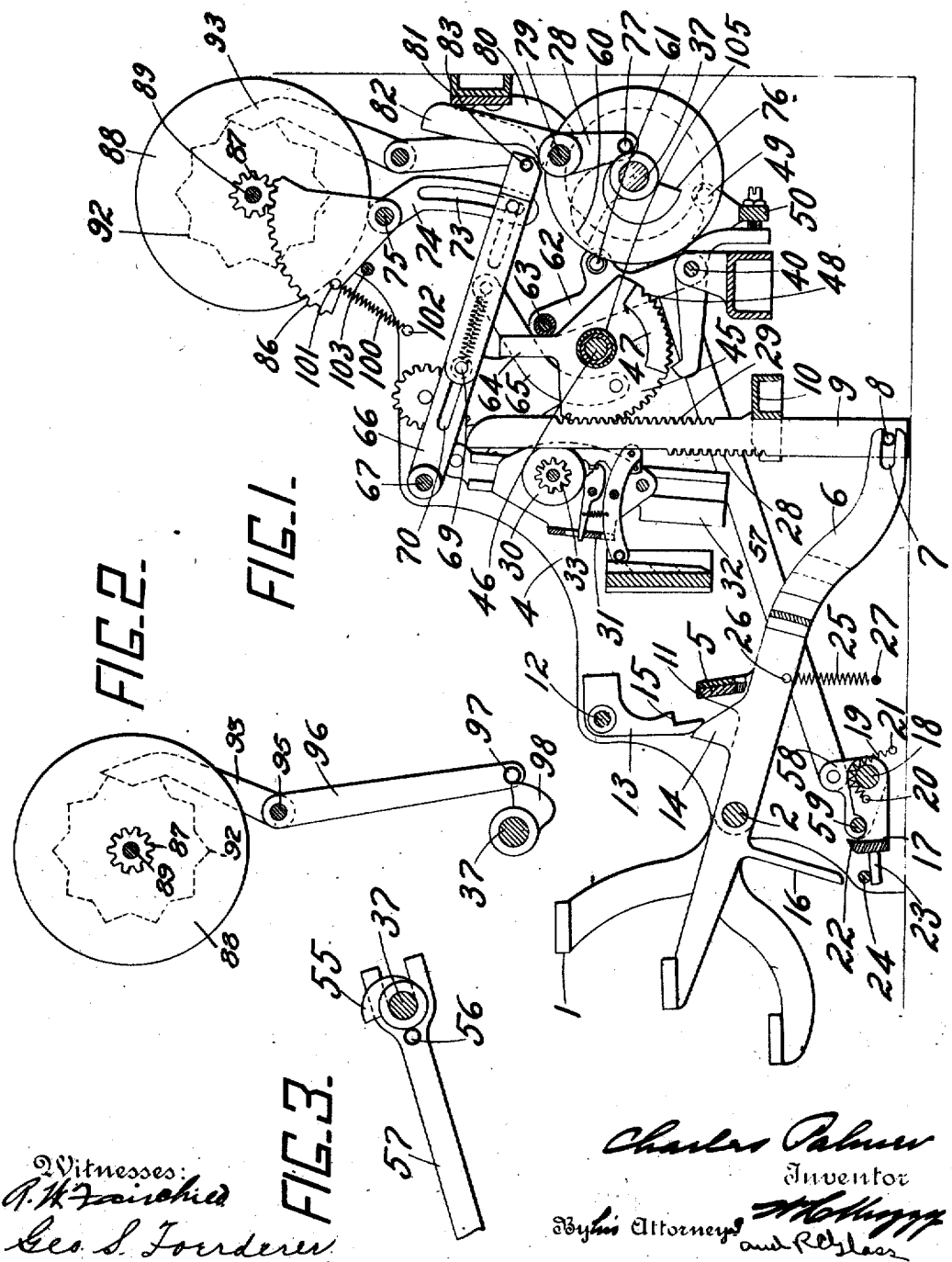

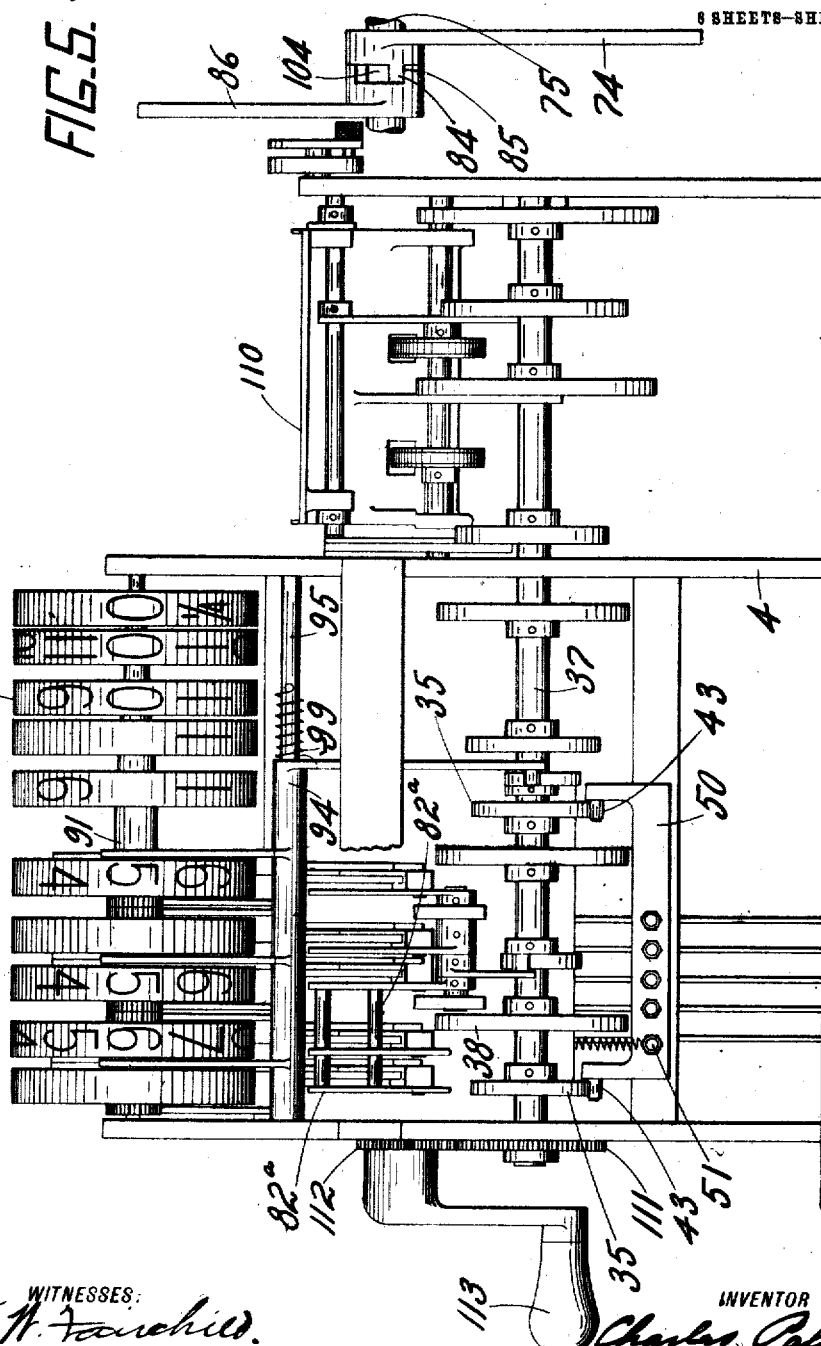

C. PALMER.
CASH REGISTER.
APPLICATION FILED MAR. 28, 1910.
1,011,996.
Patented Dec. 19, 1911.
6 SHEETS—SHEET 3.
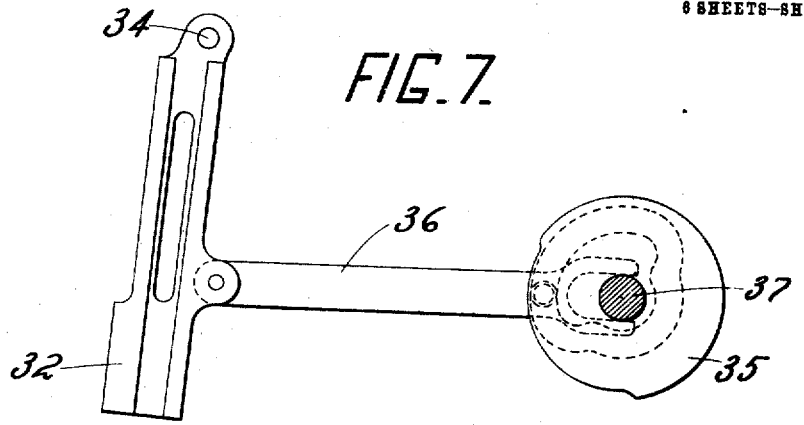
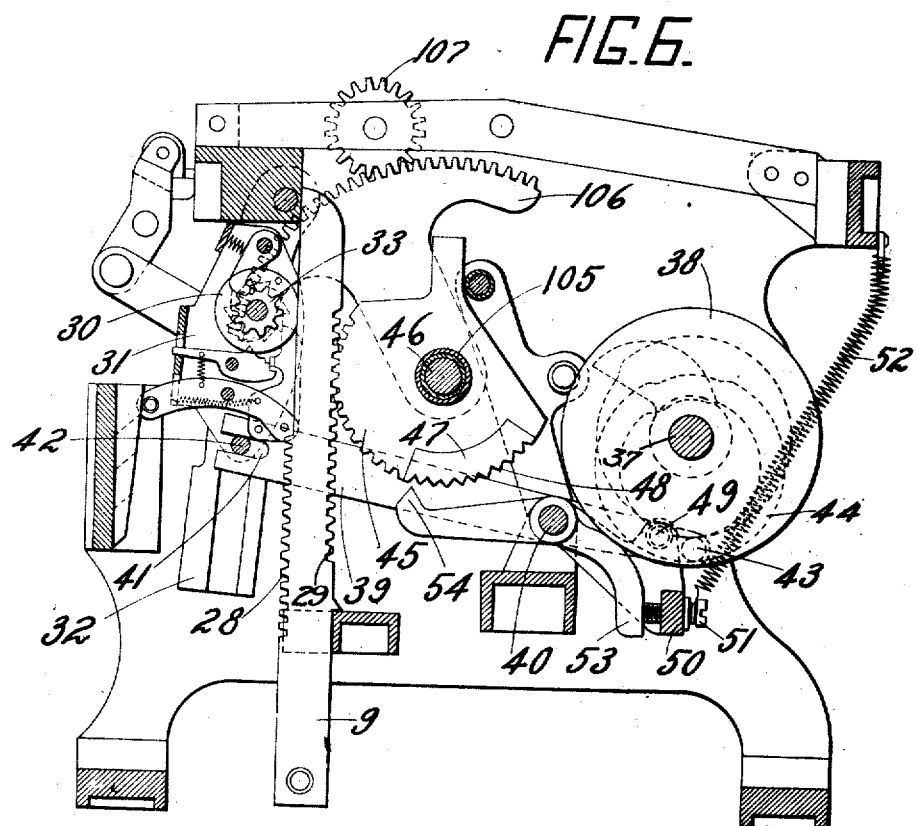

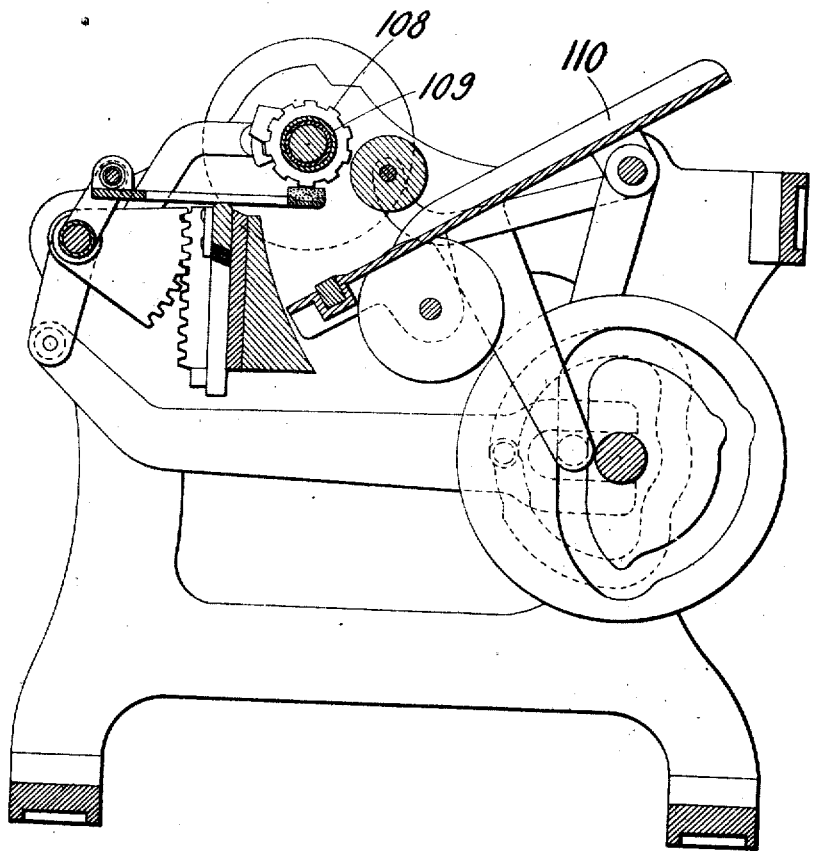

C. PALMER.
CASH REGISTER.
APPLICATION FILED MAR. 28, 1910.

1,011,996.

Patented Dec. 19, 1911.
6 SHEETS—SHEET 5.

WITNESSES:
P. W. Fairchild
Geo. S. Foerderer

INVENTOR
Charles Palmer
BY
ATTORNEYS

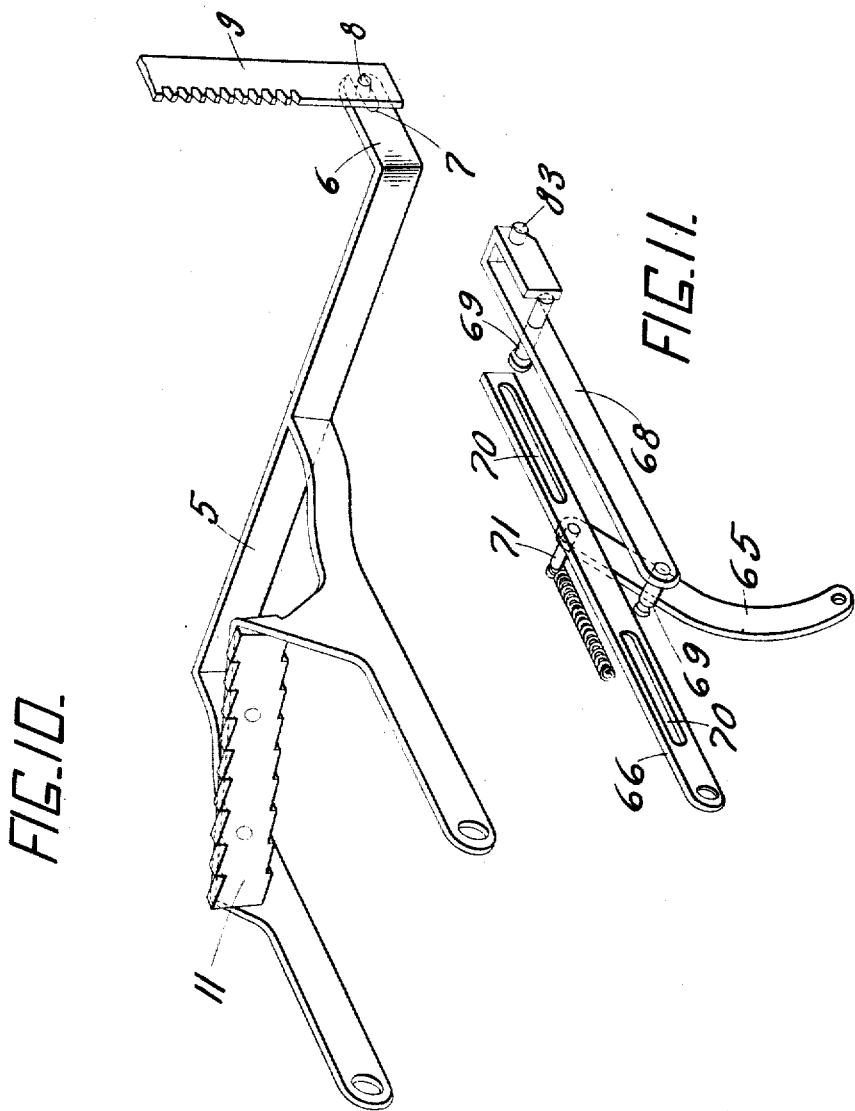

UNITED STATES PATENT OFFICE.

CHARLES PALMER, OF LONDON, ENGLAND, ASSIGNOR TO THE NATIONAL CASH REGISTER COMPANY, OF DAYTON, OHIO, A CORPORATION OF OHIO, (INCORPORATED IN 1906.)

CASH-REGISTER.

1,011,996.  Specification of Letters Patent.  Patented Dec. 19, 1911.

Application filed March 28, 1910. Serial No. 552,046.

*To all whom it may concern:*

Be it known that I, CHARLES PALMER, a subject of the King of Great Britain and Ireland, residing at London, in the county of Middlesex, England, have invented certain new and useful Improvements in Cash-Registers, of which I declare the following to be a full, clear, and exact description.

This invention relates to improvements in cash registers and more particularly in that style of register in which the amounts to be added, indicated and recorded are first determined by the operation of keys or other manipulative devices, and then the operation completed by the actuation of a crank handle or other suitable operating device.

The principal object of this invention is to provide a keyboard mechanism for the type of machine shown and described in application Serial No. 356,096, February 6, 1907, by Thomas Carroll and also in Patent No. 934,994, issued September 28, 1909, to said Carroll.

Another object of this invention is to provide an improved form of actuating devices for the indicating mechanism.

With these and incidental objects in view the invention consists in certain novel features of construction and combinations of parts, the essential elements of which are set forth in appended claims, and a preferred form of embodiment of which is hereinafter described with reference to the drawings which accompany and form part of the specification.

Of said drawings: Figure 1 is a transverse sectional view of the machine. Fig. 2 is a detail view of the alining and arresting device for the indicators. Fig. 3 is a detail view of a cam and link for operating the key releasing mechanism. Fig. 4 is a rear elevation of a machine embodying the invention. Fig. 5 is an enlarged rear elevation of one of the actuating devices for one of the indicators. Fig. 6 is an enlarged transverse sectional view through the registering mechanism and its coöperating parts. Fig. 7 is a detail view of the operating mechanism for reciprocating the frame in which the registering mechanism is mounted. Fig. 8 is a transverse sectional view through the printing mechanism. Fig. 9 is a top plan view of the keyboard mechanism showing the registering determining elements in section and the graduated frames connected to said elements and operated by the keys. Fig. 10 is a perspective view of one of the graduated frames and its registering determining element. Fig. 11 is a perspective view of the indicator determining mechanism unassembled.

In general terms, the invention comprises a plurality of banks of keys, each bank of which actuates a graduated frame, this frame being connected to a rack or registering determining element. These racks through suitable link connections operate arms which form the determining mechanism for the adjustment of the indicators. Type-carriers are also suitably secured to the registering racks and are moved therewith. After the amount to be totalized, indicated and recorded has been determined by the operation of the appropriate keys, the operation is completed by the rotation of a suitable crank handle. During this rotation of the crank handle, the totalizing mechanism is given a translatory movement over the registering racks and the indicating mechanism is rotated to bring into view the amount registered upon the registering mechanism. During the operation of the totalizing and indicating mechanisms, impressions are taken from the printing devices. After the amount has been registered, indicated and recorded, the indicators are latched in their adjusted position and the registering rack and type-carriers are returned to normal position. From this brief general description it is thought that a good idea of the operation of the machine may be had so that the detailed description which is about to be given may be followed to better advantage. This detailed description will be divided into the following divisions: Keyboard mechanism, registering mechanism, indicating mechanism, and printing mechanism.

*Keyboard mechanism.*—As shown in Fig. 9, the keys 1 are arranged in groups or banks and as shown in said figure are adapted to register English currency. These keys 1 are pivoted upon a transverse rod 2, the latter being suitably supported in the side frames 4 of the machine. Also pivoted upon this rod 2 are a plurality of yoke-shaped graduated frames 5 one for each bank of keys. Extending rearwardly from each one of the frames 5 is an arm 6 provided at its extreme rear end with a slot 7. In each one of the slots 7 of the arm 6 extends a pin 8. These pins 8 are mounted upon the lower ends of registering racks or determining elements 9, which extend vertically and are guided by a tie bar 10 which is supported by the side frames 4. Each one of the frames 5 (see Fig. 10) is provided with a stepped bar 11, the underside of which the keys of that particular frame contact and thereby move the said frame and bar differentially. Mounted upon a transverse rod 12 which is secured in the side frames 4 are a plurality of hangers 13 one for each key. Each key 1 in the rear of its pivotal point has extending upwardly therefrom, a projection 14 which, when any one of the keys is operated contacts with the lower front side of its respective hanger 13 and thereby forces a shoulder 15 of said hanger into the path of the bar 11 to arrest the upward movement of said bar and frame 5. The keys 1 are given a constant movement upon the operation of same and it will be seen from Fig. 10 that the bar 11 which lies across the keys of the bank to which this bar belongs has a step arrangement on both its under and upper sides. From this it will be seen that the frame 5 is given a differential movement by the keys corresponding thereto and consequently the registering determining element 9 will also be moved differentially. The keys 1 have, just in front of their pivotal points, downwardly extending projections 16 which are beveled at their extreme downward ends. Upon depressing any one of the keys, the beveled portion of the projection 16 will contact with the upper side of a latching frame 17 of which there is one for each bank of keys, pivoted upon a cross rod 18 suitably secured within the side frames 4, and rock said frame against the tension of a spring 19. The spring 19 which has its ends secured to a pin 20 projecting from the frame and to a rod 21 secured in the side frames 4 will return the latching frame 17 to normal position after its depression by a key, in which position a nose 22 on said frame will engage with the projection 16 and hold said key in its depressed position. Each of the frames 17 is limited in its upward movement by a pin 23 which contacts with the underside of a cross rod 24 suitably secured in the side frames 4. The keys when released as hereinafter described will be returned to their normal position by springs 25 which have their ends secured to pins 26 projecting from the rear ends of the keys and to a cross rod 27 mounted in the frame work of the machine.

The registering determining elements 9 have formed upon their forward edge, teeth 28, and upon the rearward edge similar teeth 29. The teeth 28 engage with a totalizing mechanism hereinafter described, to register the amount represented by the depressed keys, while the teeth 29 are arranged to adjust indicator determining devices and type-carriers as will hereinafter be fully described.

*Registering mechanism.*—The wheels 30 of the totalizing mechanism are mounted within a carriage 31, the latter in turn being suitably mounted within a frame 32. Each one of the total wheels 30 has attached thereto a pinion 33 which is arranged to engage with the teeth 28 of its respective determining element 9 and thereby have the amount set up on the determining element registered on the said totalizer wheel. The frame 32 in which the carriage 31 is mounted is pivoted as at 34 (see Figs. 6 and 7) and upon the first movement of the crank handle it is arranged to be swung around its pivotal point 34 by cams 35 which are connected to said frame by links 36 to bring the pinions 33 into the same line as the teeth 28 of the registering determining elements 9. The cams 35 are mounted upon a driving shaft 37 the latter also carrying cams 38. After the frame 32 has been swung so as to bring the pinions 33 into the path of the teeth 28 a downward movement is imparted to the carriage 31, carrying the wheels 30 and pinions 33, by levers 39 which are pivoted upon a short rod 40 suitably secured in the frame work of the machine, the forward end of said levers 39 being provided with slots 41 which straddle the rod 42 mounted in the carriage 31, while the rearward end of said levers are provided with friction rollers 43 projecting in cam grooves 44 of the cams 38. This movement of the carriage 31 and the carriage supporting frame 32 is fully shown and described in the before-mentioned application and patent of said Thomas Carroll and it is thought no further description thereof is necessary.

The teeth 29 of the registering racks or determining elements 9 mesh with segments 45 which are mounted upon a shaft 46 the latter being suitably mounted within the side frames of the machine.. Fastened to the sides of these segments 45 are plates 47 provided with V-shaped notches 48. After the racks 9 and the segments 45 have been adjusted by the operation of the keys or manipulative devices 1, the shaft 37 will be rotated. Upon the beginning of movement of the shaft 37, the enlarged portions of the cam disks 35 will engage with rollers 49 projecting from a frame 50 and depress said frame (see Figs. 1, 4 and 6). This frame 50 is pivoted upon the rod 40 and carries a plurality of adjusting nuts 51. A spring 52, one end of which is secured to one of the nuts 51 and the other to a portion of the frame, holds the rollers 49 in contact with the periphery of the cam disk 35. As the frame is depressed, the adjusting nuts 51 will contact with the rear ends of pawls 53 which are centrally pivoted upon the rod 40, the forward end of said pawls being provided with V-shaped heads 54 which are positioned to engage the notches 48 formed upon the plates 47 secured to the segments 45 and thereby lock said segments and the registering determining elements 9. Near the end of the rotation of the shaft 37, a cam 55 (Fig. 3) secured thereto will contact with a pin 56 secured to the rearward end of a link 57 and force said link forwardly. The forward end of the link 57 is secured to a bell crank lever 58 which is loosely mounted upon the rod 18. This bell crank lever 58 has secured to its free end a rod 59 which projects over all of the latching plates 17, the said rod 59 being supported at its opposite end by a lever (not shown) similar to the bell crank lever 58. It will be seen from this description that the rod 59 will depress all of the latching frames 17 near the end of the rotation of the shaft 37 and thereby withdraw the noses 22 of said frames 17 from engagement with the projections 16 of the operated keys, thereby leaving said keys free to be returned to their normal position by the springs 25. The latching frames 17, as previously described, are returned to their normal position by their springs 19. These plates in turn will return the rod 59 and link 57 to their normal positions. Immediately after the release of the keys as above described, a cam 60 secured to the shaft 37 (see Fig. 1) will contact with a roller 61 projecting from an arm 62 pivoted upon the rod 40. This arm 62 has secured to it at its upper end a horizontal rod 63, the other end of rod 63 being supported by an arm, not shown, but similar to arm 62. As the cam 60 engages the roller 61 mounted upon the arm 62, the rod 63 will contact with projections 64 of any of the operated segments 45 and return said segments and registering racks 9 connected thereto to normal or zero position as shown in Fig. 1 of the drawings. Just previous to the engagement of the cam 60 with the roller 61 the enlarged portions of the cam disks 35 will pass out of engagement with the rollers 49 of the frame 50 thereby allowing the spring 52 to withdraw said frame 50 and the adjusting nuts 51 out of engagement with the rear end of the pawls 53 thereby permitting the forward ends 54 of said pawls to drop out of engagement with the V-shaped notches 58 formed in the plates 47 secured to the segments 45. This positive return of the registering determining elements 9 also insures the return of the yoke-shaped frames 5 connected thereto.

*Indicating mechanism.*—Connected to the segments 45 are one end of links 65, the other end of said links being secured to arms 66 mounted loosely upon a transverse rod 67 suitably secured to the frame work of the machine (see Figs. 1, 4 and 11). Mounted upon each one of the arms 66 is an arm 68 which is arranged to move with the arm 66 about the shaft 67 and in addition has a radial movement upon the arm 66. Each arm 68 is guided in its radial movement upon the arm 66 by pins 69 which extend through slots 70 formed in the arm 66. A spring having its ends connected to one of the pins 69 and to a pin 71 projecting from the arm 66 is arranged to hold the arm 68 in its extreme rearward position with the pins 69 contacting with the ends of the slots 70 of the arm 66. Thus it will be seen that as the registering racks 9 and the segments 45 are adjusted by the operation of the keys 1, the arms 66 and 68 will also be rotated about the rod 70. The rearmost pin 69 of each arm 68 is arranged to pass through an elongated slot 73 of an arm 74, the upper ends of all of which are loosely mounted upon a transverse rod 75 suitably secured in the side frames of the machine. At the beginning of each operation of the machine, the slots 73 of the arms 74 form arcs of circles struck from the shaft 67 upon which the arms 66 are mounted. From this it will be seen that the movements of the arms 68 due to the operation of the keys 1, as previously described, do not in any way affect the arms 74. Upon the beginning of the movement of the shaft 37 the segments 45 and consequently the arms 66 and 68 will be locked from any movement about the shaft 67. After the arms 66 and 68 have been locked from rotary movement, a cam 76 secured to the shaft 37 will contact with a pin 77 projecting from the lower end of an arm 78 which is secured to a short shaft 79, the latter being mounted in a bracket 80 secured to a tie bar 81 forming a part of the frame of the machine. As the cam 76 contacts with the pin 77 and thereby rocks the rod 79, upwardly extending arms 82 secured to said rod 79 will be rocked counter-clockwise and if any one of the arms 68 has been adjusted the arm 82 corresponding thereto will contact with a pin 83 projecting from the arm 68 and move said arm radially upon the other arm 66. The arms 82 will not contact with the pins 83 of the arms 68 that have not been adjusted. So as not to interfere with one of the cams 38 (see Fig. 4), the rod 79 is shortened and the two left-hand arms 82 are fastened by short rods 82ª to the center arm 82, the two left-hand arms 82 thereby receiving the same extent of movement as the arms secured to the shaft 79. The radial movement of the arms 68 will, by means of the pins 69 which extend through the slots 73 in the arms 74, rotate the latter about the rod 75.

Projecting from the hub of each arm 74 is a lug 84 (Fig. 5) which contacts with a shoulder 85 formed upon the hub of a segment 86, which is also loosely mounted upon the rod 75, and carries said segment with it. Each of the segments 86 meshes with a pinion 87 secured to the side of one of the indicators 88 which are mounted upon a shaft 89 secured in the side frames of the machine. The movements of the indicators to which the pinions 87 are secured are conveyed to the back indicators 90 by means of nested sleeves 91, as is well known in the art (see Fig. 4).

Secured to each of the front indicators upon the sides opposite the pinions are star wheels 92 which are arranged to be engaged by alining pawls 93 projecting upwardly from a sleeve 94, the latter being loosely mounted upon a transverse rod 95 mounted in the frame work of the machine. Projecting downwardly from the sleeve 94 is an arm 96 upon the lever end of which is secured a roller 97 which is engaged by a cam 98 secured to the shaft 37. The timing of this alining device is such that at the beginning of the rotation of the shaft 37 the cam 98 passes from engagement with the roller 97 and a spring 99 coiled about the rod 95 will rock the sleeve 94 so as to carry the pawls 93 out of engagement with the star wheels 92 and thereby permit springs 100 to return the segments 86 and thereby the indicators, to normal or zero position. The ends of the springs 100 are secured to pins 101 projecting from the segments 86 and to a rod 102 extending from one of the frames 4 of the machine. The indicators are limited in their return movement by the segments 86 contacting with a rod 103 suitably supported in the frame work.

Referring to Fig. 5 of the drawings, it will be seen that the hub of each of the segments 86 is provided with an enlarged recess 104 in which the shoulder 84 of the hub of each arm 74 plays. This recess 104 is large enough to permit the arm 74 to return to normal position at the end of each operation of the machine independently of its segment 86. The arms 66 and 68 of each indicating determining element form parts of a movable member one part of which has a movement independent of the other part.

*Printing mechanism.*—Each one of the segments 45 is secured to one end of one of a series of nested sleeves 105 which surround the shaft 46, the other ends of said sleeves being secured to segments 106 which mesh with pinions 107. These pinions 107 are connected to type-carriers 108 by means of nested sleeves 109 (see Figs. 6 and 8). From this it will be seen that any movements of the segments 45, caused by the registering elements 9, are conveyed to the type-carriers 108. A table 110 upon which a sales slip is placed is rocked several times during the operation of the machine to carry the sales slip into contact with the type-carriers to receive an impression. Between these impressions the sales slip is fed forward and the portion upon which the first impression is made is severed from the sales slip upon the taking of the second impression. This construction forms no part of the present invention and is fully shown and described in the above mentioned application and patent of Thomas Carroll.

The shaft 37 has secured to one end (see Fig. 4) a gear 111 which through suitable immediate gears meshes with a gear 112 fastened to a crank handle 113.

Thus it will be seen that the patented machine is by this invention, well adapted for a key control. The keys when operated directly position the determining racks and the type-carriers, and set the indicator controlling slides. An operation of the handle moves the totalizer over the determining racks, causes the printing impressions, and adjusts the indicators. Near the end of each operation the determining racks are positively restored to normal position, thus resetting the type-carriers; but by the form of connection shown the indicators may remain in set position until the next operation of the machine. The determining graduated frames are positively stopped at the end of their upward movement, thus preventing overthrow.

While the form of mechanism herein shown and described is admirably adapted to fulfil the objects primarily stated it is to be understood that it is not intended to confine the invention to the one form of embodiment herein shown and described as it is susceptible of embodiment in various forms all coming within the scope of the claims which follow.

What is claimed is:

1. In a cash register, the combination with a plurality of registering determining elements, of graduated frames connected thereto, manipulative devices for controlling the movement of the graduated frames and thereby the determining elements, a plurality of indicators, a plurality of two part members connected to the registering elements for determining the movement of said indicators, a totalizing mechanism, and an operating means for imparting to said mechanism a translatory movement to totalize the amount set up by the registering elements, and for moving one part of each indicator determining member so as to actuate said indicators.

2. In a machine of the class described, the combination with a rotary indicator, of a determining device therefor comprising two slidably connected parts one of which is pivoted, means for rotating said determining device around its pivot, an operating mechanism having connections to move said connected part radially of the pivot, and permanent connections from said latter part to said indicator.

3. In a machine of the class described, the combination with a rotary indicator, of a determining device therefor comprising two slidably connected parts one of which is pivoted, means for rotating said determining device around its pivot, an operating mechanism having connections to move said connected part radially of its pivot, devices permanently joining said connected part to said indicator, and means actuated by said operating mechanism for latching the indicator in adjusted position while permitting the return of the determining device.

4. In a machine of the class described, the combination with a rotary indicator, of a pivoted determining device therefor comprising two loosely connected parts, differential mechanism connected to rotate said determining device, a pivoted actuating arm positioned to engage one of said connected parts, and move it radially of said pivot, and an arm connected to said indicator and permanently joined to said radially movable part.

5. In a machine of the class described, the combination with a rotary indicator, of a depending pivoted arm connected to operate said indicator, an upstanding pivoted operating device with means to give said device invariable movements, manipulative devices, and an element differentially adjusted by said manipulative devices and positioned to connect said upstanding operating device to said depending arm in any position of said element.

6. In a cash register, the combination with a rotary indicator, a pivoted member for rotating said indicator, a pivoted actuating device for said member, and an adjustable element moving between the pivots of said member and device and controlling the operation of the former by the latter, the construction being such that the movement of the pivoted member has an inverse ratio to the distance of said adjustable element from the pivot of said pivoted member.

7. In a cash register, the combination with a differentially movable element, of a rotating device composed of two parts for determining the extent of movement of said element, one of said parts having a radial as well as a rotary movement, manipulative devices for rotating said device, a normally inoperative locking device for said rotating device, and an operating mechanism for first operating the locking device to prevent rotary movement of the device and then actuating the radially movable part thereof which latter movement in turn actuates the differential element.

8. In a cash register, the combination with a plurality of registering racks, a graduated frame connected to each rack, a series of keys for each frame for differentially moving the same and thereby the rack connected thereto, type carriers connected to said racks, impression devices for the type carriers, rotating devices composed of two parts also connected to said racks, one part of each device having a radial as well as a rotary movement, a series of indicators, connections between the radially movable parts of the arms and the indicators, a registering mechanism, and an operating mechanism having connections for moving the latter over the racks to register the amount set up thereon, for taking an impression from the type carriers and for actuating the radially movable parts of the arms to operate the indicators thereby indicating the amount registered and printed.

9. In an accounting machine, the combination with an accounting device, of a differentially movable actuator therefor, a device for imparting differential movement to said actuator, and having a permanent connection therewith, operating mechanism connected to reciprocate said device, and means for adjusting said device relatively of said actuator to determine the differential movement of said actuator.

In testimony whereof I affix my signature in the presence of two witnesses.

CHARLES PALMER.

Witnesses:
A. E. MELHUISH,
W. E. BROWN.